United States Patent [19]
Klees

[11] 3,792,584
[45] Feb. 19, 1974

[54] INCREASED OR VARIABLE BYPASS RATIO ENGINES

[75] Inventor: Garry W. Klees, Mercer Island, Wash.

[73] Assignee: The Boeing Company, Seattle, Wash.

[22] Filed: Feb. 16, 1972

[21] Appl. No.: 226,850

Related U.S. Application Data

[63] Continuation-in-part of Ser. No. 196,422, Nov. 8, 1971.

[52] U.S. Cl. .................. 60/204, 60/226 R, 415/79
[51] Int. Cl. .............................................. F02k 3/04
[58] Field of Search ..... 60/224, 225, 226, 244, 262, 60/204; 415/79

[56] References Cited
UNITED STATES PATENTS

| | | | |
|---|---|---|---|
| 2,596,406 | 5/1952 | Imbert | 60/262 |
| 2,738,645 | 3/1956 | Destival | 60/262 |
| 2,930,190 | 3/1960 | Rogers | 60/226 R |
| 3,161,018 | 12/1964 | Sandre | 60/262 |
| 3,191,886 | 6/1965 | Lewis | 60/226 R |
| 3,362,431 | 1/1968 | Chaulin | 60/244 |
| 3,432,100 | 3/1969 | Hardy | 60/244 |

*Primary Examiner*—Douglas Hart
*Attorney, Agent, or Firm*—Bernard A. Donahue; Glenn Orlob

[57] ABSTRACT

Air breathing gas turbine engine design concepts, methods and apparatus for economically increasing the bypass ratio of conventional engine designs and/or for providing a variable bypass ratio feature. The disclosed preferred embodiments each involve a flow control system for internal management of intake and exhaust air within the engine comprising separated annular first and second duct means shaped and arranged to cross-over or invert air flow patterns within the confines of an annular passageway having an area substantially equal to the combined area of the two separated flow patterns. In this manner the quantities of air which pass to or from the various engine components can be routed without interference, necking down, or departure from the confines of the annular passageway. The system may be modified to achieve variable bypass ratio by providing a means for switching flow patterns between adjacent duct means of separated upstream and downstream portions to switch from inverted to straight through flow. The duct means comprise a plurality of conformably nesting basic duct elements of unique configuration and have utility in solving a variety of engine air flow control problems. The disclosed variable bypass engine concepts can be used in present aircraft propulsion systems to reduce jet and turbomachinery noise, to improve the installed drag characteristics of multimission propulsion units, and to improve fuel consumption rates.

35 Claims, 46 Drawing Figures

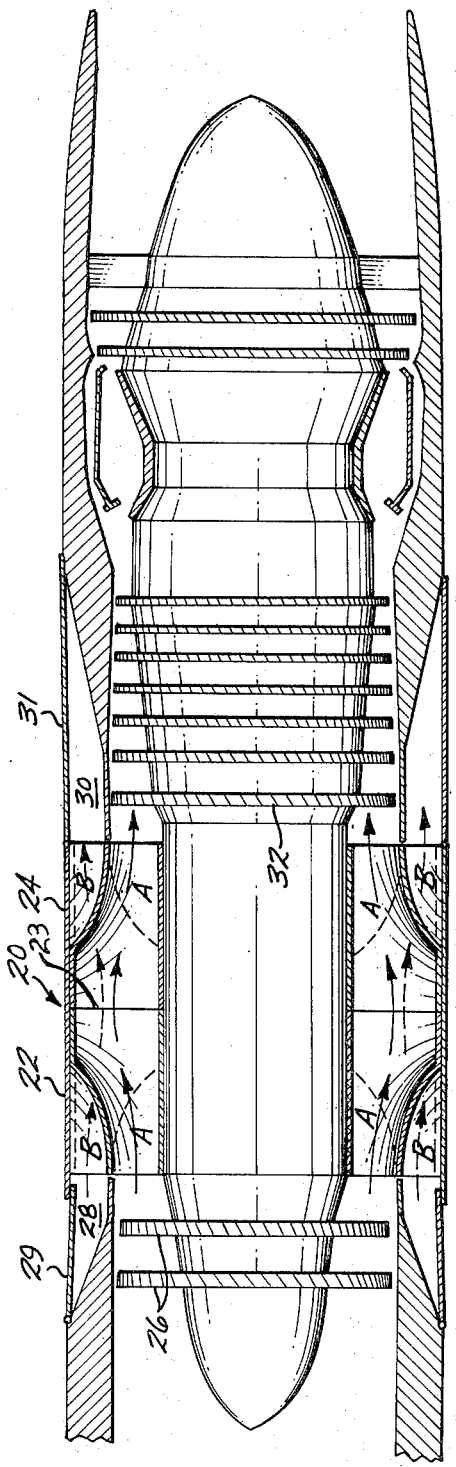
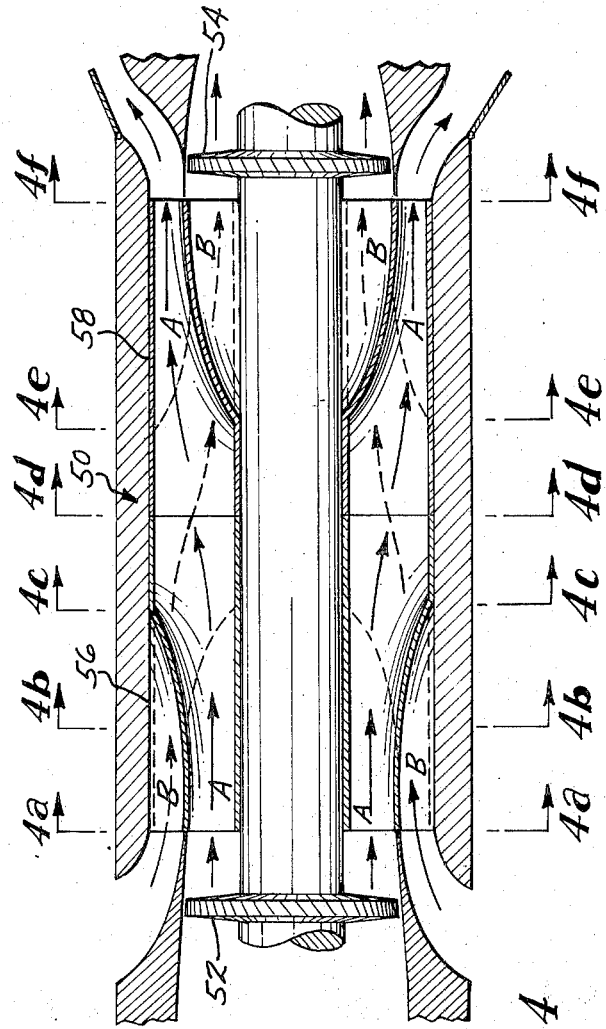
Fig. 3
Fig. 4

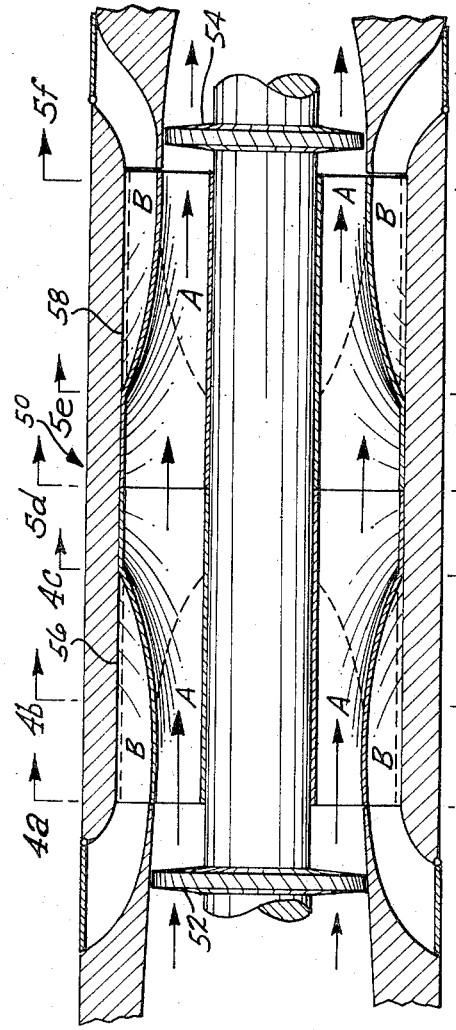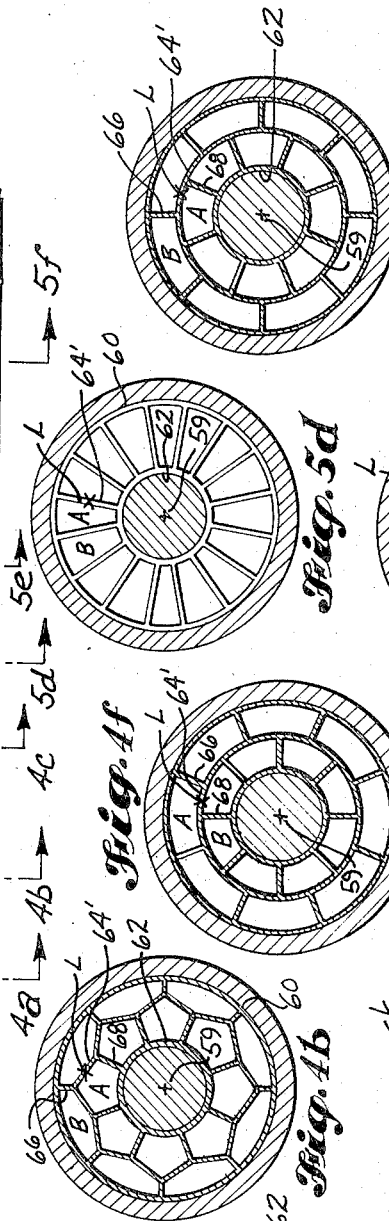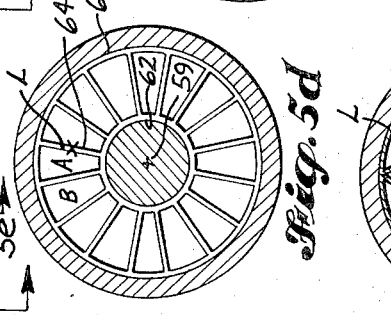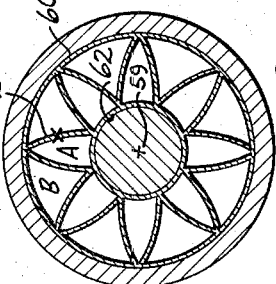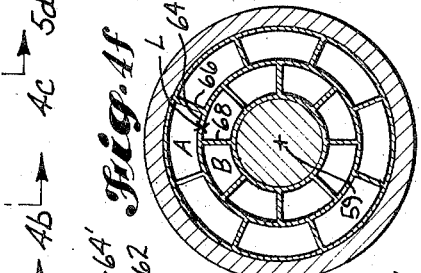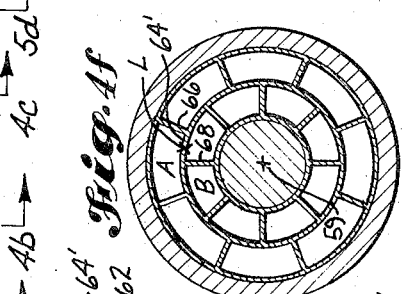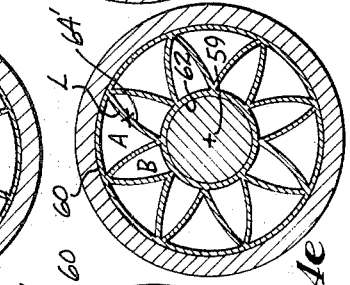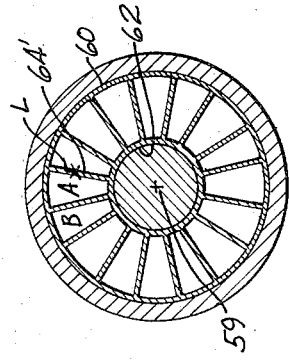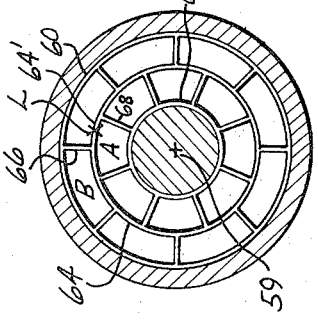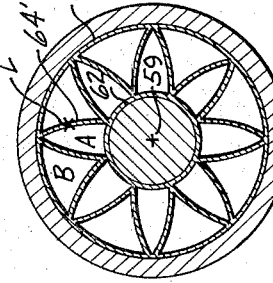

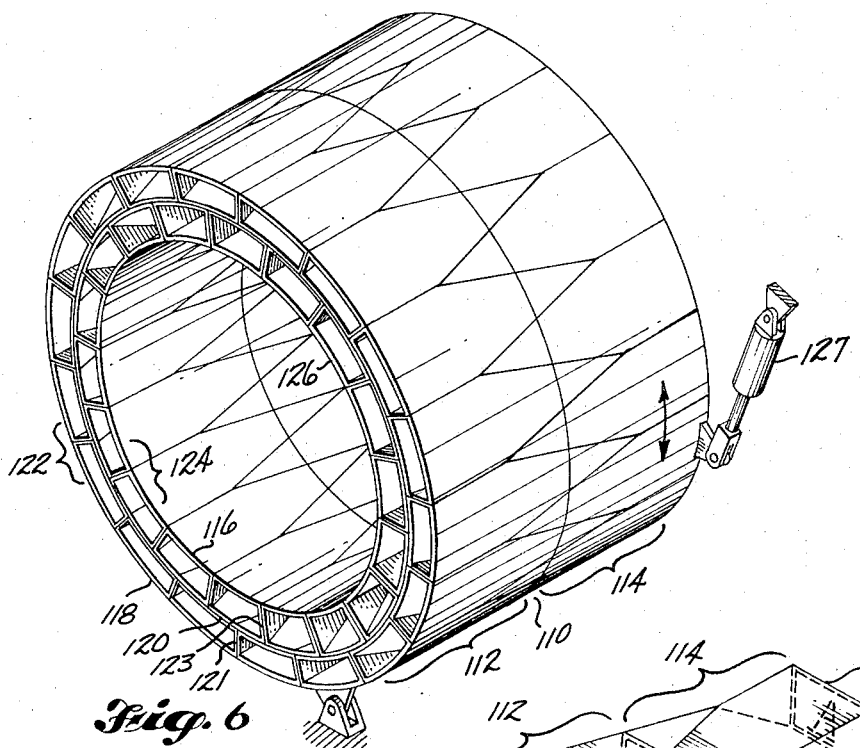
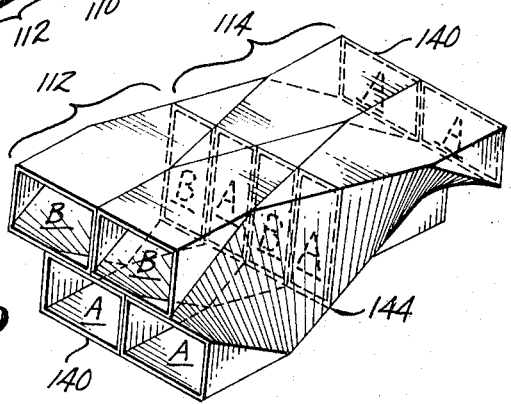
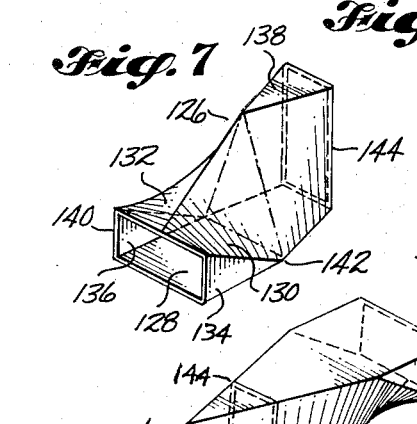
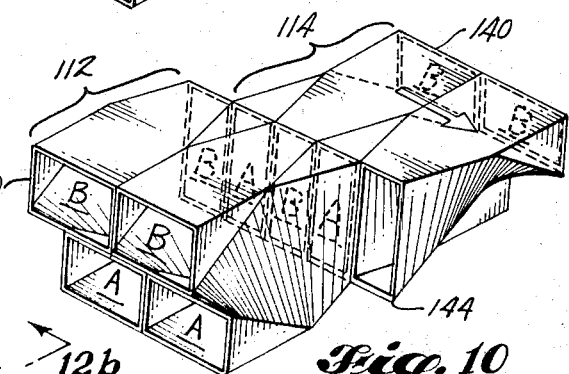
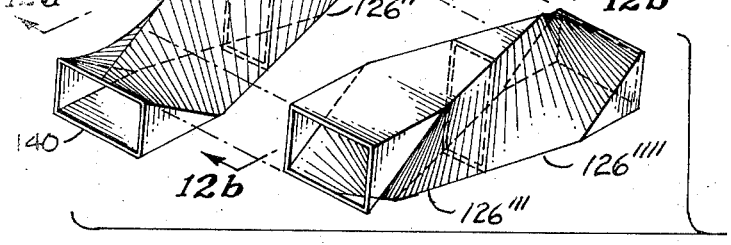

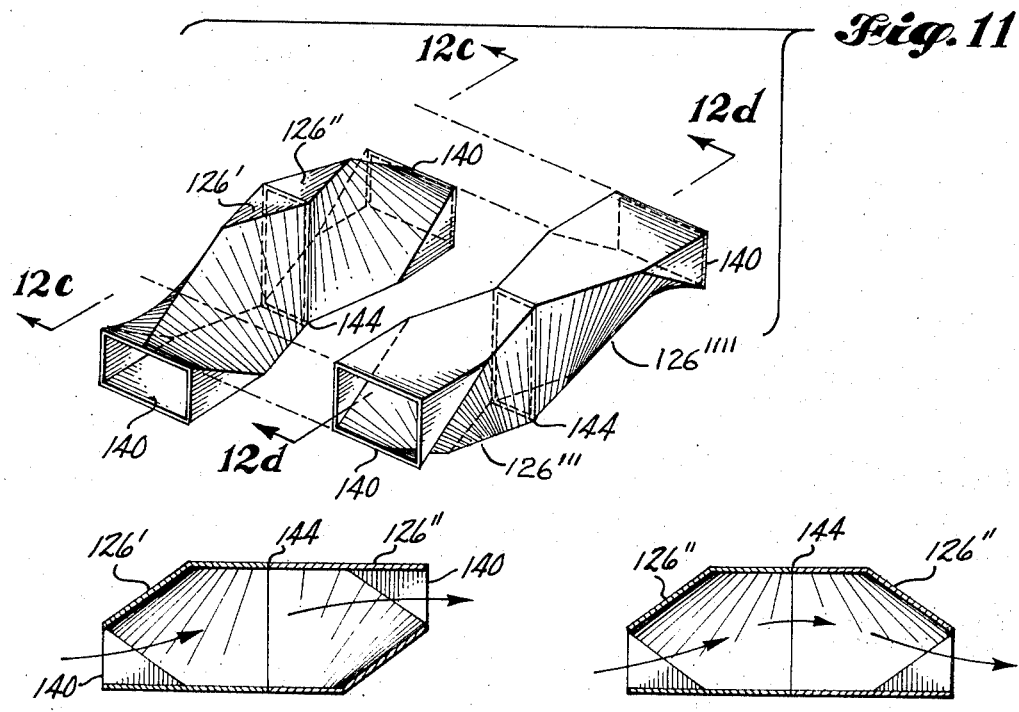
Fig. 11
Fig. 12a
Fig. 12c
Fig. 12b
Fig. 12d
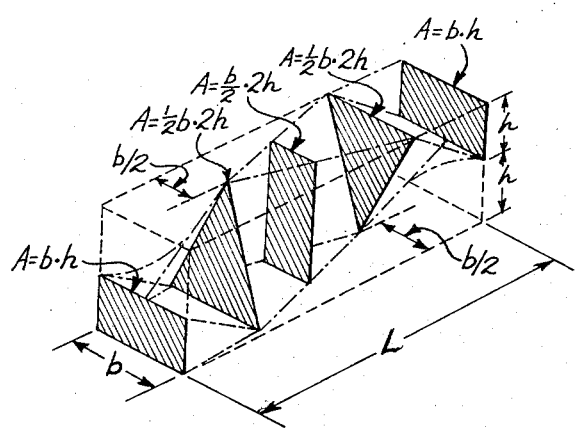
Fig. 13

FORWARD FAN TURBOFAN

FORWARD AND AFT TURBOFAN

SINGLE SPLIT TURBOJET

TURBOFAN-TURBOJET-RAMJET ENGINE (TTRE)
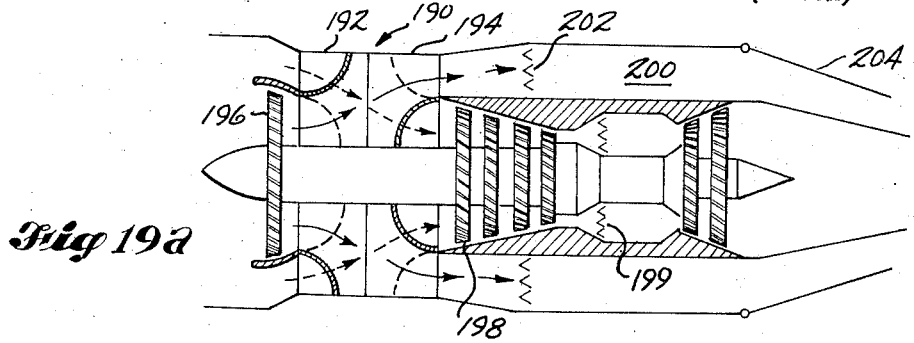
*Fig. 19a*
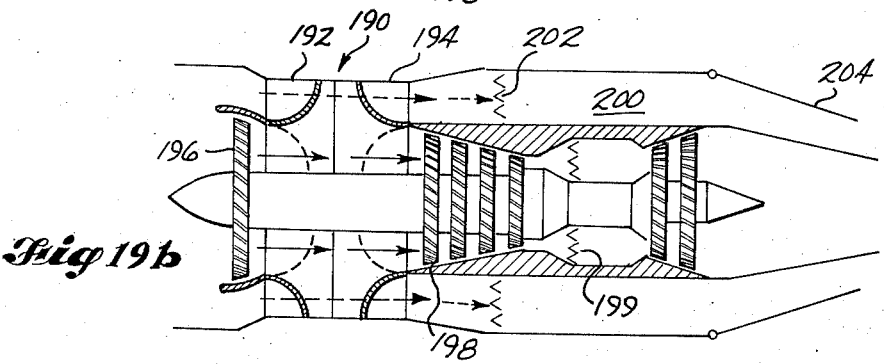
*Fig. 19b*
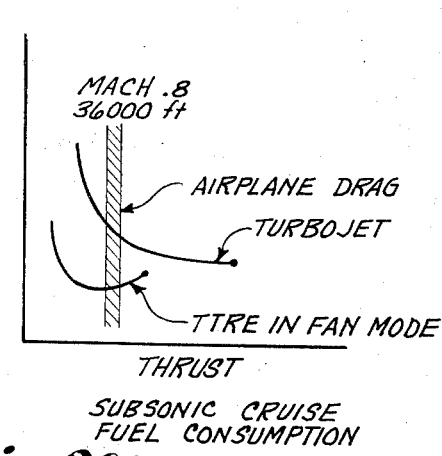
*Fig. 20a* SUBSONIC CRUISE FUEL CONSUMPTION
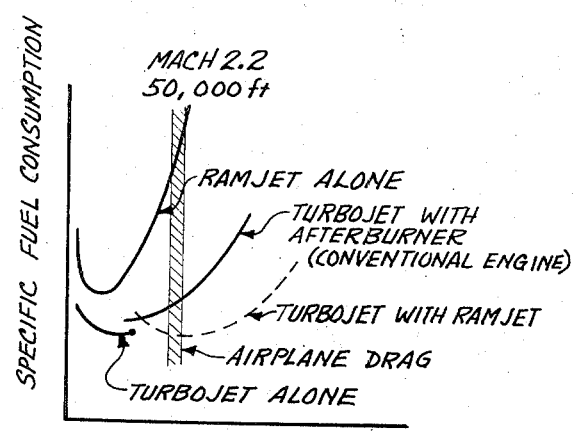
*Fig. 20b* SUPERSONIC CRUISE FUEL CONSUMPTION
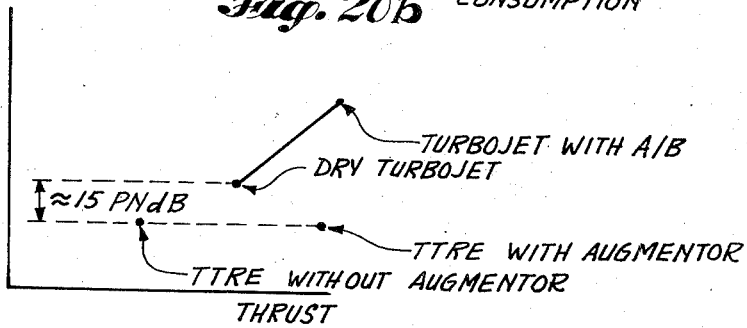
*Fig. 20c* TAKEOFF, NOISE AND THRUST COMPARISON

TURBOFAN – RAMJET ENGINE (TRE)
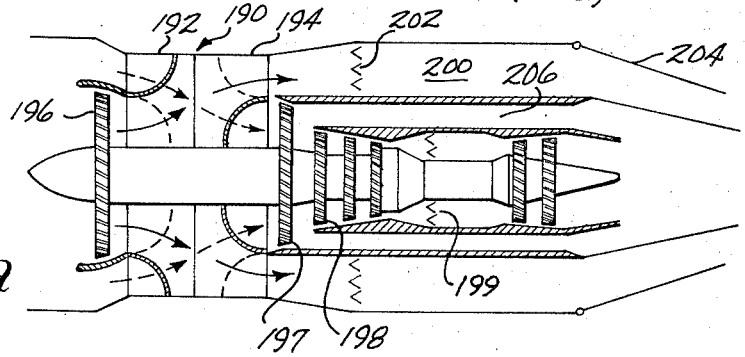
Fig. 21a
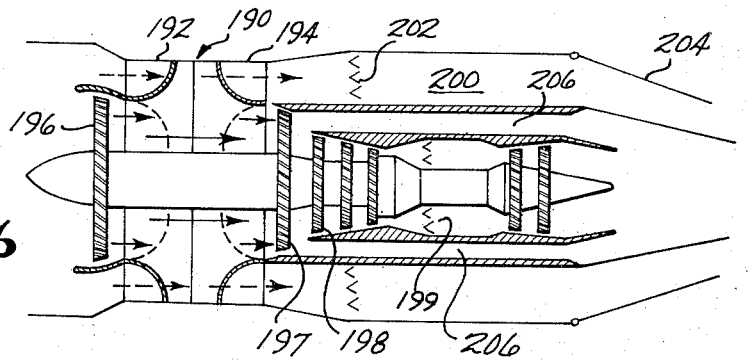
Fig. 21b
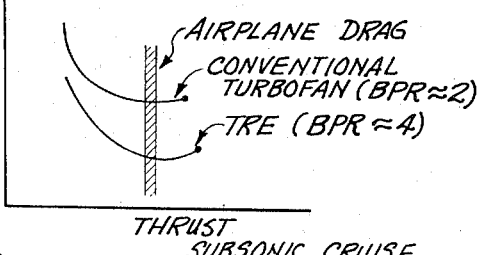
Fig. 22a SUBSONIC CRUISE FUEL CONSUMPTION
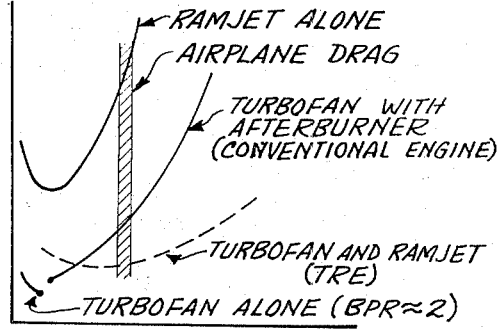
Fig. 22b SUPERSONIC CRUISE FUEL CONSUMPTION
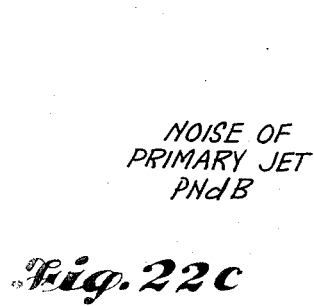
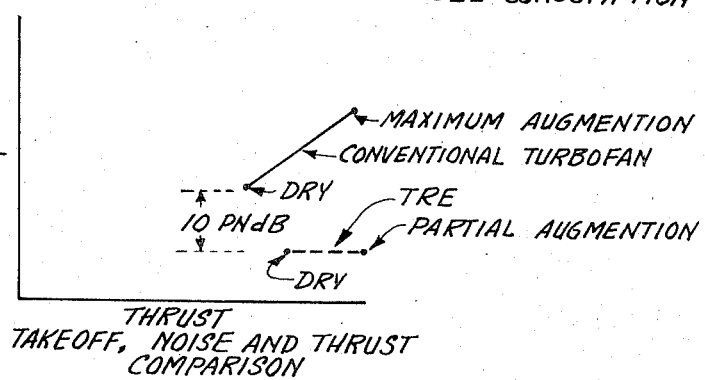
Fig. 22c TAKEOFF, NOISE AND THRUST COMPARISON

INCREASED OR VARIABLE BYPASS RATIO ENGINES

FIELD OF THE INVENTION

This is a continuation-in-part of U. S. Pat. application Ser. No. 196,422, filed Nov. 8, 1971, entitled "Annulus Inverting Valve." This invention relates to air breathing turbine engine design concepts and apparatus for internal management of the quantities of air passing through the engine; and more particularly, to apparatus for increasing the bypass ratio of single bypass ratio engines, and/or for providing a two-position or variable bypass ratio for such engines.

BACKGROUND OF THE INVENTION

Growing public concern over airport community noise has made the reduction of jet engine noise a critical design objective for aircraft propulsion engineers. There are two major sources of noise in gas turbine powered airplanes; noise originating in the turbomachinery, and noise originating in the jet efflux.

Bypass ratio is an important engine cycle chracteristic which significantly influences jet noise, turbomachinery noise, and the cruise performance of an airplane. Low jet noise is characteristic of high bypass ratio engines because of the large amount of fan work extracted from the gas generator flow, which results in relatively low primary exhaust pressure, temperature, velocity and noise. Turbomachinery noise generated by high bypass ratio engines is predominant over the jet noise. High bypass ratio is normally achieved by large fans. Larger fan diameters cause higher tip speeds and more noise.

In low bypass ratio engines the problem is reversed and jet noise predominates. Most current military airplanes, and the earlier commercial airplanes now in use, have low bypass ratio jet engines which produce highly unsatisfactory jet noise levels in and around the airport community. Jet nozzle suppressors are being designed to relieve this problem, in spite of inherent weight, drag, and internal performance penalties. Jet noise could, of course, be substantially alleviated by conversion of these early low bypass ratio engines to high bypass ratio engines. However, prior to this invention, such conversions were generally considered to be too expensive to be feasible, with the costs approaching those of a new engine.

In new engine designs, high bypass ratios exceeding 10:1 have normally been achieved only with the use of a gear box to obtain proper tip speeds for large diameter fans connected to small diameter gas generators. Such gear boxes have traditionally had extremely high failure rates and for this reason, commercial aircraft designers have been reluctant to build airplanes requiring engine gear boxes, even where bypass ratios exceeding 16 are optimum, as in STOL aircraft. This invention will allow the use of bypass ratios of the order of 10:1 to 30:1 without a gear box or other expedients for turbomachinery matching. The fan-gas generator tip speed mismatch problem has caused two major penalties in recent engine designs: (1) more compressor and turbine stages are required to achieve a desired pressure ratio, and at lower efficiency than engines wherein the gas generators were designed to operate at optimum rotative speeds; and (2) the fan speed is normally compromised in the direction of increased speeds with more noise and less efficiency.

Variable bypass ratio has been a long sought goal of the aircraft engine designer. The single bypass ratio engines in use today have not realized their full performance potential in modern airplanes because the designs have been compromised to yield satisfactory performance at several flight conditions. The performance requirements at different flight conditions act to oppose one another, and the bypass ratio that is good for one condition is bad for another. One flagrant example of such an engine cycle compromise is found in current supersonic aircraft wherein a low bypass ratio is required for efficient supersonic cruise performance. As a result, very high and unsatisfactory jet noise levels are encountered in the vicinity of the airport, and subsonic performance, especially fuel consumption, is severely compromised.

To date, variable bypass ratio engines have not been successful because they have depended upon windmilling components, retractable fans, variable area turbines, or variable pitch fans and compressors to achieve a limited range of bypass ratio variation. One such system is the "compound engine" which utilizes a pair of engines in tandem, and has a first mode of operation in which only the forward engine is used, and a second mode utilizing both engines in a supercharged fashion. The compound engine has an inherent disadvantage in that certain major components are used only on a part-time basis, thereby creating dead weight when not in use. Also, the aft engine produces substantial drag in the jet efflux of the forward engine Other attempts to provide variable bypass have failed because the gas generator components could not be matched in all modes of operation, even where matching expedients such as variable stator blades were used in the compressor and turbine sections. Turbines, compressors, and fans must be matched for continuity of flow, rotational speed, and work so that they operate at favorable points within their operational envelopes. In the system of this invention, the components are inherently matched in either a low bypass or a high bypass mode of operation and devices such as variable area compressors and turbines are not required. However, such devices could be used, if desired, to achieve added benefits.

OBJECTS OF THE INVENTION

A general object of this invention is to present solutions to several current problems in aircraft propulsion design, including but not limited to the following: (1) gross changes to the engine cycle for matching diverse operating requirements of current commercial and military aircraft; (2) improvement in conventional turbofan engine design to alleviate the fan-gas generator tip speed mismatch problem, thereby reducing engine weight and fan noise; (3) a basic change to the engine cycle currently considered required for supersonic aircraft, to provide substantially improved subsonic fuel consumption and jet noise; (4) air flow management capability which can be used to create a practical variable engine cycle to improve the installed drag of the engine inlet and exhaust systems.

It is a specific object of this invention to provide a flow control system for internal management of intake and exhaust air within a turbine engine to change the bypass ratio of the engine.

It is a related specific object of this invention to provide a relatively simple and reliable flow control system which will allow the engine to be switched from one bypass ratio to a different bypass ratio without substantial penalty to engine weight or performance in either mode of operation, and resulting in substantial noise reduction benefits.

A further object of this invention to teach the use of a unique type of space-optimized flow control system for use within an air breathing turbine engine between any two rotating blade elements to create separate and distinct flow paths for the air acted upon by each of the blade elements to thereby eliminate the engine cycle matching problems created when both blade elements operate upon the same air.

A related further object of this invention is to teach the use of such a space-optimized flow control system in a turbine engine between two adjacent rotary turbomachinery blade elements of similar size for the purpose of creating a higher bypass ratio and a quiet engine cycle by utilizing means for inverting the respective positions of two adjacent flow patterns within the confines of a passageway having an area substantially equal to the combined area of the two flow patterns.

A further object of this invention is to provide, in an engine system of the type described, means for switching the flow patterns such that the bypass ratio of the engine can be selectively changed to reduce engine noise and optimize engine thrust and fuel consumption under various operating conditions.

A related object of this invention is to teach an arrangement of wall structure within the fluid passageways of a turbine engine to create a plurality of basic duct elements for communicating separated flow patterns useful in solving a wide variety of internal fluid control problems including but not limited to duct work for variable engine cycles, sound suppressors, thrust reversers, and augmentor wing and thrust vectoring systems.

SUMMARY OF THE INVENTION

These and other objects have been achieved in the preferred embodiments of the invention wherein an annular passageway, located just downstream of one of the rotary turbomachinery elements of the engine, is divided by a unique internal wall configuration into two constant area duct means having a combined area substantially equal to the total area of the annular passageway. Each duct means includes a plurality of equal area basic duct elements conformably nested together and extending longitudinally between one end and the middle of the duct means. The basic duct elements have been provided with novel constant area cross-sectional shapes chracterized by smooth cross-sectional transitions from a sector of an annulus extending from one side radially only partially across the annular passageway, to an intermediate generally triangular or petal-shaped section, and then to a sector of an annulus extending radially entirely across the passageway. Each such basic duct element used in the system is of identical cross-sectional area, and therefore corresponding duct elements may be longitudinally mated at the sections which extend entirely across the passageway to continue the flow of air to exit cross-sections located on the opposite side of the annular passageway from that of the entrance cross-section. In this manner two flow patterns may be inverted or crossed-over between the entrance and exit ends of the passageway. For example, entrance flow from the outer side of the annular passageway may be taken from an auxiliary air inlet at the cowling surrounding the forward fan compressor blades and routed to the inner side of the annular passageway at the exit end thereof to deliver air to downstream compressor blades, completely independent of a separate flow pattern running from the forward fan compressor blades to a bypass nozzle surrounding the downstream compressor blades. The inverting flow control system just described is advantageously made to function as a valve for a variable, or two position, bypass ratio merely by sectioning the passageway system into separate upstream and downstream portions, and providing means for switching flow between next adjacent basic duct elements at their interface sections, thereby switching from inverted high bypass ratio flow to straight through flow for conventional low bypass ratio or turbojet operation.

BRIEF DESCRIPTION OF THE DRAWINGS

FIG. 3 is a cross-sectional view of the engine of FIG. 2, with the aft portion of the valve mechanism rotated from its FIG. 2 position to provide straight through flow for the low bypass ratio mode of operation.

FIG. 4 is a schematic side elevation cross-sectional view of the valve mechanism of this invention located between any two rotating turbomachinery elements of an air breathing engine, and positioned for flow inversion. FIGS. 4a through 4f are cross-sectional views taken at successive longitudinal locations through the valve as noted in FIG. 4.

FIG. 5 is a cross-sectional view of the valve mechanism of FIG. 4 with the aft portion of the valve rotated and repositioned for straight through flow. FIGS. 5d 5e and 5f are cross-sectional views through the aft portion of the valve.

FIG. 6 is an isolated isometric view of an annulus inverting valve passageway flow control system of the invention positioned for flow inversion.

FIG. 7 is a detailed expanded view of one of the basic duct elements used in FIG. 1, shown here with an infinite annular radius for ease of portrayal.

FIG. 8 is an exploded view of two individual adjacent duct means each comprising a pair of mated basic duct elements.

FIG. 9 is an isometric view of four adjacent duct means each comprising forward and aft basic duct elements aligned for flow inversion.

FIG. 10 corresponds to FIG. 9 with the forward and aft basic elements shifted and realigned for straight through flow.

FIG. 11 is similar to FIG. 8 except that each pair of basic duct elements have been shifted and mated for straight through flow.

FIGS. 12a through 12d are cross-sectional views through the duct means of FIGS. 8 and 11, taken as noted thereon.

FIG. 13 is a schematic showing of longitudinally spaced cross-sectional shapes of an individual duct means positioned for inversion of flow.

FIGS. 19a and 19b depict a Turbofan-Turbojet-Ramjet Engine (TTRE) configuration of this invention.

FIGS. 20a through 20c are fuel consumption and noise plots illustrating the improved results of the TTRE configuration.

FIGS. 21a through 22c show a Turbofan-Ramjet Engine (TRE) embodiment.

FIGS. 22a through 22c are plots for the TRE embodiment, similar to those of FIGS. 20a through 20c.

DESCRIPTION OF PREFERRED EMBODIMENTS

Figure 1:
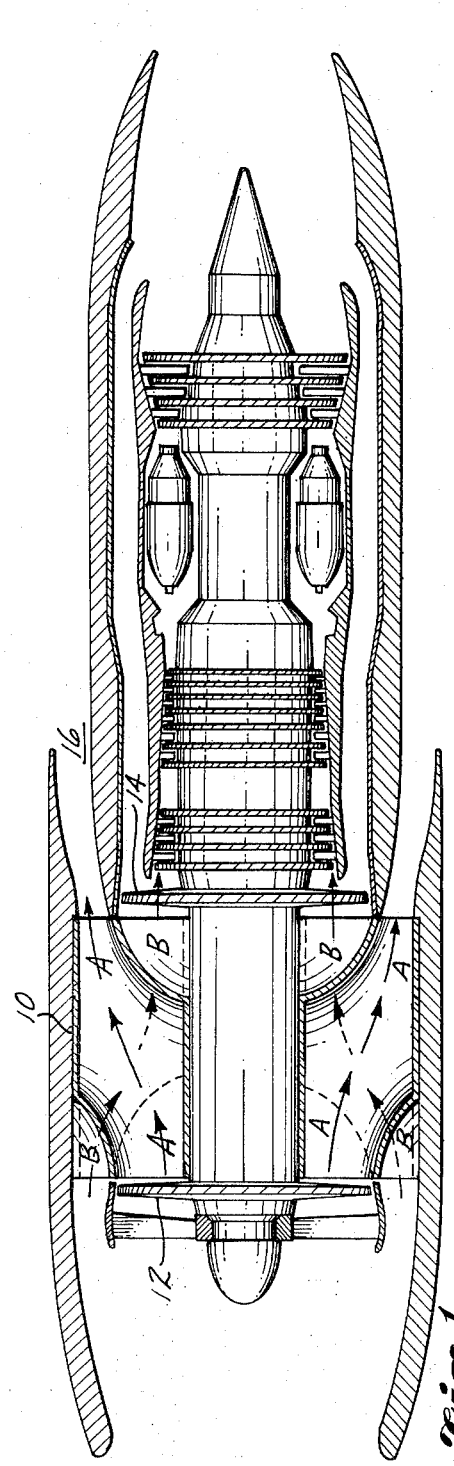
FIG. 1 is a schematic cross-sectional view through a modified engine of the JT8D type, incorporating the annulus inverting passageway concepts of this invention to yield a fixed but higher bypass ratio.

FIG. 1 is a schematic cross-sectional view through a turbofan engine of the JT8D type, modified to incorporate a fixed version of the flow control passageway system of this invention for the purpose of converting the engine to a fixed but higher bypass ratio. As is well-known, turbofan bypass ratio is the ratio of the mass of air acted upon by the fans and sent direct to discharge nozzles, to the mass of air entering the engine core for combustion through the turbine stages. Unmodified engines of the type shown here normally have bypass ratios of the order of 1.0. Modified as shown in FIG. 1, the bypass ratio will be approximately 3.7. Engine test results have verified predicted improvements of 10 PNdB reduced jet noise, increased thrust, and lower specific fuel consumption. Windtunnel model tests of passageway configurations have shown pressure recovery levels exceeding 98 percent using passageway lengths of no more than six times the annular height, and an internal design Mach No. of M = 0.5.

In FIG. 1, a special passageway system 10, of a type to be fully described in connection with the other figures of the drawings, has been installed between adjacent forward and aft fans 12 and 14, which in the original engine design are located in close proximity to one another. Consequently, the overall engine length has been increased by the length of the passageway system 10. However, as will be apparent in the discussion which follows, the engine length, weight, size, and internal flow penalties attendant to the inclusion of the passageway system 10, are more than offset by the improved noise characteristics, thrust levels, and full consumption performance of the higher bypass ratio engine. In fact, in some instances, the increased engine length may be useful to airframe designers. Recent state-of-the-art advances in engine design have allowed shorter and shorter engines with fewer stages. As a result, in certain aircraft designs, it has been necessary to lengthen engine inlet and exhaust ducts to obtain better nacelle slenderness ratios for drag purposes, or to reposition inlet and exhaust openings free of interference with the airframe.

The unique FIG. 1 passageway system 10 comprises a first duct means A and a separate second duct means B for inverting two separated flow patterns within the confines of the annular passageway. The separated duct means have adjacent annular cross-sections which become inverted, or reversed in their spatial relationship to their common axis, between the entrance end and the exit end of passageway 10. The two duct means have a combined total cross-sectional area substantially equal to the cross-sectional area of passageway at any location along its length, allowing only for the area occupied by the relatively thin walls of the passageway. In the embodiment shown, the area of each of the duct means A and B is equal and constant along the passageway length, although the concepts disclosed are applicable to nonequal areas for the two duct means, and also to nonuniform or conical annular passageways.

Accordingly, in FIG. 1, all air passing through forward fan 12 enters duct means A on the inner side of the annular passageway 10 and exits along the outer side into fan nozzle 16. Intake air entering the duct means B in the outer annular region surrounding forward fan 12 passes directly to aft fan 14 unaffected by action of forward fan 12. The embodiment of FIG. 1 is integrally constructed to provide fixed passageways, and therefore a fixed or single bypass ratio. Other embodiments to be described will utilize means for obtaining variable or multiposition bypass ratio. However, the fixed passageway system shown here is important in that it offers a relatively simple and very reliable means for grossly increasing the bypass ratio of certain existing engine designs, with accompanying noise reduction and engine performance benefits.

Figure 2:
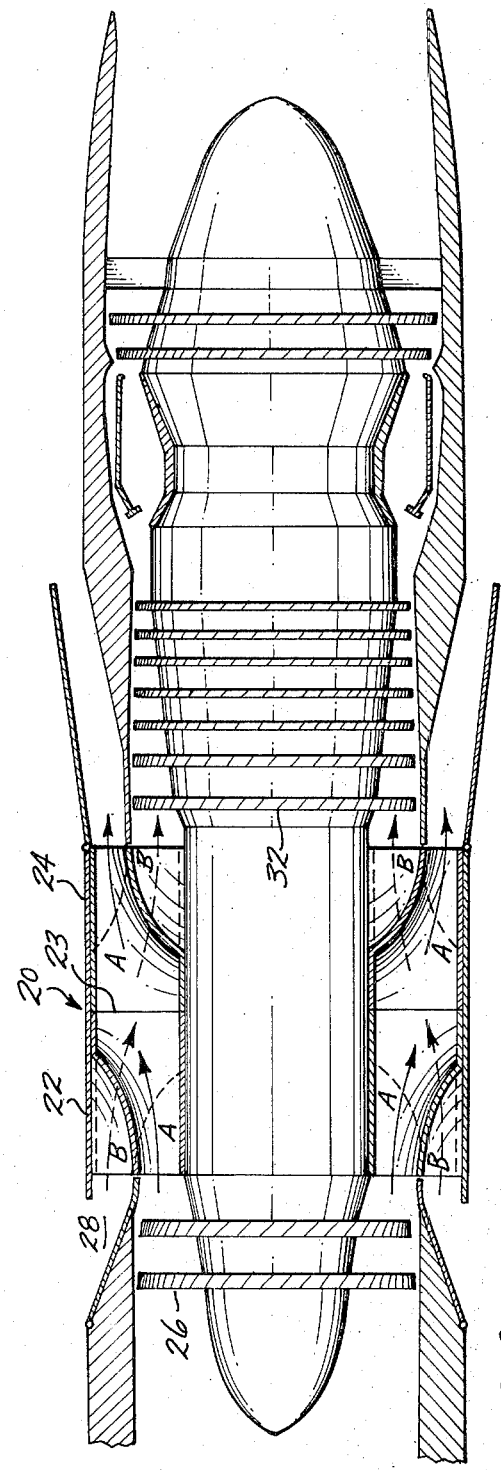
FIG. 2 is a partial cross-sectional view through a supersonic engine embodiment, incorporating a variable bypass valve mechanism of this invention, shown in the flow inversion or high bypass ratio mode of operation.

FIG. 2 is a partial cross-sectional view of a supersonic turbojet engine, of the GE-4 type, into which a switchable, or variable bypass, annulus inverting valve embodiment of this invention has been incorporated. The original bypass ratio was, of course, zero. As modified, the bypass ratio shown is approximately 1.7. The valve 20 is depicted here as positioned in the high bypass mode and comprises a fixed forward portion 22 extending to an interface plane 23, and a rotatable, or relatively moveable, aft portion 24. Positioned as shown, the valve will function to provide high bypass ratio operation in a manner similar to that of the fixed passageway system of FIG. 1. In FIG. 2, air from the forward fans 26 is driven into inner annular duct means A, while intake air is drawn from the engine cowling through auxiliary intake passageway 28 into outer annular duct means B. In the takeoff and subsonic cruise mode shown, the annulus inverting valve converts the engine from a straight turbojet to a bypass or turbofan engine. All air from forward fans 26 is delivered directly to a fan nozzle 30, and all auxiliary intake air is routed to the aft compressor and turbine units 32; the two flow patterns each being contained in separate duct means of constant and equal cross-sectional area. Installation of an annulus inverting valve of this invention into a supersonic engine of the type shown will normally not require any major modifications of inlet configuration, exhaust nozzle, afterburner or thrust reverser. The same gas generator may be used with a shaft extension in the compressor.

FIG. 3 shows the engine of FIG. 2 with the moveable aft portion 24 of valve 20 rotated by a conventional actuation mechanism (not shown) to switch the flow through the valve into a straight through, or low bypass ratio, mode of operation, by realignment of certain passageway elements of the forward and aft portions 22 and 24 at the interface plane 23, to eliminate the inversion of the outer and inner flow patterns. As shown in FIG. 3 the engine will operate as a conventional turbojet with the supersonic performance and engine cycle being essentially unchanged by the presence of the valve system 20. As noted earlier, passageway pressure recovery levels are extremely high with the system of this invention. The outer annular duct means B is unused for this mode of operation in the embodiment shown. However, the outer duct system is available and conveniently located for many purposes including passage of nozzle cooling air and excess inlet air, and other functions to be discussed in connection with subsequent figures.

FIG. 4 is a side elevation section view of a 16 duct element valve embodiment of the invention positioned for flow inversion. The valve 50 extends between two rotary blade elements 52 and 54 of a turbine engine, and is divided at center section 4d–4d into a forward portion 56, and an aft portion 58. The valve is provided with a conventional actuation mechanism for rotating the aft portion, to thereby provide means for switching between inverted and straight through flow in a manner to be discussed in connection with subsequent figures.

FIG. 4a, taken at 4a–4a in FIG. 4, shows the entrance section of the annular valve passageway to be bounded by an outer wall 60, an inner wall 62, and divided by a center wall 64, to thereby form adjacent concentric inner and outer annular portions of equal cross-sectional areas and having a combined area substantially equal to the total area of the annular valve passageway. The inner annular portion extending from inner wall 62 to center wall 64 acts as a first duct means A. The outer annular portion between center wall 64 and outer wall 60 acts as a second duct means B for communicating fluid through the valve separate from the fluid carried by first duct means A. Each duct means is divided into eight individual duct elements by the radially extending wall members 66 and 68 which provide common walls for next adjacent duct elements. At the entrance section shown in FIG. 4a, it can be seen that each individual duct element has the cross-section of a circumferentially elongated sector of an annulus, and that the duct wall members 68 of first duct means A are arranged in circumferentially staggered positions with respect to wall members 66 of second duct means B. Also, for purposes of explanation in connection with subsequent figures, a locus line L which extends parallel to the longitudinal axis 59 of valve means 50 has been shown in FIG. 4a at the center of a center wall segment 64' between adjacent sets of radially extending wall members 66 and 68.

FIG. 4b shows the cross-sectional shapes of the individual duct elements at 4b–4b in FIG. 4. The shapes are basically pentagonal. The wall segment 64' has been rotated about locus line L and reshaped such that equal areas are maintained between duct elements of the duct means A and B, thereby requiring a slight curvature not apparent in the scale of the drawing.

FIG. 4c, taken at 4c–4c in FIG. 4, displays three-sided petal shaped duct element sections. Wall segment 64' has continued its rotation about locus line L and has been reshaped and extended to entirely eliminate wall members 66 and 68.

FIG. 4d shows the cross-section existing at the valve interface plane 4d–4d in FIG. 4, corresponding to the interface section 23 of previous figures. Wall segment 64' is further rotated about locus line L and reshaped such that it is now straight and radially aligned with longitudinal axis 59. Duct elements of the first duct means A and the second duct means B now occupy alternate annular sectors defined by the wall segments 64' which extend radially entirely across the annular passageway between outer wall 60 and inner wall 62. The 16 duct elements between adjacent wall segments 64' have equal area identical cross-sections which are segments of an annulus having a circumferential arc of $360°/n$, where n is the total number of duct element passageways.

FIG. 4e is taken at 4e–4e within aft portion 58 in FIG. 4. Note that the section is located at the same distance from the interface plane as section 4c–4c of forward portion 56. The wall segment 64' has been further rotated clockwise and shaped to form one side of a three-sided duct element of the type shown in FIG. 4c, thereby displaying the same petal-like cross-section configuration. Note, however, that the FIG. 4e petals appear to be displaced by one-sixteenth, or $1/n$, of one rotation with respect to the FIG. 4c petals. This is because the shape of the duct elements of the first duct means (labeled A) have changed in shape from generally triangular with apex outward in FIG. 4c to generally triangular with apex inward in FIG. 4e. In each embodiment of this invention, whether it is a fixed flow inversion system or a moveable valve device, corresponding sections spaced equal distances on opposite sides of the central interface plane will display the same cross-sectional shapes. However, when used for flow inversion as shown in these figures, the shapes will appear rotated by $360°/n$ with respect to the corresponding section. In the case of a relatively moveable valve embodiment, it should now be apparent that interface sections of the forward and aft portions may be selectively realigned by a relative rotation of $1/n$ revolutions, or $360°/n$ in terms of degrees, to thereby cause fluid to pass straight through the valve without flow inversion, in which case corresponding sections on opposite sides of the interface plane will appear to be identically aligned in "mirror image" fashion.

Accordingly, to obtain flow inversion, the exit section of FIG. 4f is identical in shape but appears rotated by one-sixteenth of a revolution from the entrance section shown in 4a. In FIG. 4f the annular first duct means A surrounds the annular second duct means B. This is an inverted or reversed relationship to that which exists at the entrance section of the valve shown in FIG. 4a.

Therefore, the valve means 50 can be seen to provide a flow control system for inverting the separate flow patterns of duct means A and B from the entrance section to the exit section. As noted previously, this has been accomplished within the confines of an annular passageway wherein the first and second duct means have a combined cross-sectional area substantially equal to the cross-sectional area of the passageway. It is noted that in the successive section views of FIGS. 4a through 4f each individual duct element passageway remains symmetrical about a radial plane passing through the longitudinal axis 59 of the valve. For example, the individual duct element passageway marked "A" can be seen to maintain symmetry about a vertical radial plane while shifting radially outwardly from a position along the inner wall 62 in FIG. 4a to a position along the outer wall 60 in FIG. 16.

Referring now to the straight through flow position of FIG. 5 and section views 5d, 5e and 5f, it should be apparent that the invention provides means for switching from inverted to straight through flow merely by angular rotation of the aft portion 58 with respect to the forward portion 56 by 360°/n, or one-sixteenth of a revolution in this case, to thereby align next adjacent annular sectors at the interface plane.

FIGS. 5d, 5e and 5f correspond to FIGS. 4d, 4e and 4f, but show an angular rotation of aft portion 58 of the valve means 50 to create a mirror image situation about the interface plane, to thereby deliver the two annular flow patterns at the exit end in the same spatial relationship which exists at the entrance end.

FIG. 6 schematically depicts an annulus inverting valve 110 in an isolated isometric view. The valve 110 is sectioned into relatively moveable forward and aft portions 112 and 114 each bounded by an inner side 116 and an outer side 118 of an annular passageway. At the entrance end of the valve (near side as shown), center wall structure 120 separates the passageway into a first duct means 122 having an annular entrance configuration, and a second duct means 124 having an annular configuration concentric with, and inside of, the first duct means 122. Each of the first and second duct means 122 and 124 are divided into a plurality of individual basic duct elements 126. For purposes of illustration, circumferentially adjacent duct elements 126 are shown to be separated by radial walls 121 and 123 at the valve entrance plane. However, since the two basic separated flow patterns being controlled by the first and second duct means are annular, the flow will naturally divide between circumferentially adjacent duct elements, and therefore, in most practical embodiments, radial entrance (or exit) walls such as 121 and 123 will not be necessary or desirable. An actuator means 127 in combination with the fixed pin restraint shown provides a means for causing selective rotation of aft portion 114 with respect to forward portion 112.

The basic duct element 126 is shown isolated in FIG. 7. As will become more apparent in the discussion which follows, duct elements 126 may be appropriately reoriented, nested or joined with other such elements to allow flow to be controlled within a fluid passageway in a novel manner. For purposes of simplicity in describing the concepts of the invention, the duct elements 126 are shown to resemble individual building blocks, each having its own exterior wall structure. However, it will be readily understood that this is for purposes of illustration only, and that in most practical applications adjacent duct elements will utilize single and common walls. Also, it will be noted that FIGS. 7 through 13 each show duct elements having straight line segments, or segments having an infinite annular radius, for ease of portrayal. While the inventive concepts have utility in straight line ducting work, to date the most important practical applications relate to true annular passageway configurations. In the discussion which follows, straight line terminology is used for ease of description. However, this terminology should be interpreted to cover all equivalent annular or curved sections. For example, the generally rectangular sections illustrated, discussed, and claimed, should be considered to be equivalent to similarly sized sectors of an annulus having curved concentric sides.

Referring now to FIG. 7, the basic duct element 126 can be seen to have a first wall surface 128; oppositely facing symmetrically disposed second wall surfaces 130, 132 and third wall surfaces 134, 136; and an opposite wall surface 138. As noted previously in connection with the FIG. 6 radial walls 121 and 123, wall surfaces 134 and 136 are not necessary when circumferentially adjacent duct elements 126 will share the flow in a natural manner, as in the case of most embodiments contemplated at this time. The duct element 126 defines at the entrance end (near side), a generally rectangular section 140 having one of its long sides formed by the first wall surface 128 and extending partially across the total passageway in a direction perpendicular to the first wall surface 128. As is more fully shown in the cross-section schematic view of FIG. 13, the basic duct element 126 maintains a constant duct area along its length, and the wall sufaces 130, 132 provide a smooth gradual transition from the entrance rectangular section 140 to an intermediate triangular section 142, and then to a generally rectangular section 144 which extends vertically across the passageway at the opposite end of the basic duct element 126. The first wall surface 128 is normally a wall segment of the total passageway and forms a long side of rectangular section 140, one side of triangular section 142, and a short side of rectangular section 144 at the opposite end of the element 126. The smooth gradual transition between each of the defined sections has been accomplished by shaping second wall surface 130, 132 to create a uniformly varying curvature for the walls of the passageway. It will be noted that wall surfaces 130, 132 correspond to the wall segments 64' discussed in connection with the cross-sections taken from FIGS. 4 and 5.

FIG. 8 is an exploded isometric view of two next adjacent individual duct means each comprising a mated pair of basic duct elements 126, of the type shown in FIG. 7. Basic duct element 126' is identically disposed to the FIG. 7 element 126 and joined at its rectangular section 144 to a second element 126'' which has been rotated and inverted from the FIG. 7 position. It will readily be apparent that flow entering rectangular section 140 of duct element 126' will be communicated through the mated rectangular sections 144 into duct element 126'' and hence out of rectangular section 140 at the opposite end of the element 126''. Accordingly, when the duct system 126', 126'' is installed in a fluid passageway, the flow will be forced to enter a rectangular section extending partially across the passageway, pass through a rectangular section extending entirely across the passageway, and exit through a rectangular section which extends partially across the passageway from the opposite side of the passageway from that of the entrance end. In this manner, a first duct means is provided for inverting flow from the lower to the upper side of the passageway.

In a similar fashion in FIG. 8 adjacent elements 126''' and 126'''' are mated together but rotated longitudinally such that they will conformably nest with elements 126' and 126'' while providing a constant area second duct means for inverting flow from the upper to the lower side of the passageway.

FIG. 9 shows a nested cluster of duct means of the type shown in individual detail in FIG. 8, conveniently sectioned into relatively moveable forward and aft portions 112 and 114 which interface at the intermediate rectangular sections 144. With the forward and aft portions positioned as shown, flow inversion will take place. A first duct means A is located at the entrance end of the passageway adjacent to and below a second duct means B. As has been previously discussed, each of the duct means will receive flow at the entrance end from one side of the passageway and communicate it to the opposite side at the exit end. It will be noted that while individual nested ducts having individual walls are shown here for purposes of illustration, that as mentioned earlier, most practical embodiments of the invention will utilize single walls, and no radial (or vertical) wall at all is necessary to separate circumferentially (or horizontally) adjacent duct elements which are intended to share flow in a natural manner.

FIG. 10 shows the system of FIG. 9 wherein the relatively moveable portions 112 and 114 have been displaced such that next adjacent sections 144 have been aligned to form new duct means which will pass the flow straight through the passageway between entrance cross-sections and exit cross-sections which are similarly disposed on the same sides of the passageway. Accordingly, a simple mechanical device for circumferentially (or horizontally) displacing either the forward or the aft portion 112 or 114 will provide means for switching from inverted to straight through flow. The relative positions of the basic duct elements 126 for the straight through mode of operation are displayed more clearly in FIG. 11.

FIG. 11 shows a pair of basic duct elements 126' and 126'' mated at their rectangular sections 144 to form a duct means which receives flow from a lower entrance section 140, communicates it through element 126'' and out of the passageway through an exit section 140 located on the same side of the passageway. Similarly, the adjacent duct means formed by mated elements 126''' and 126'''' directs flow received from an upper entrance section 140 out of the passageway through an upper exit section 140 located on the same side of the passageway as that of the entrance section.

FIGS. 12a, 12b, 12c, and 12d are cross-sectional views taken at designated locations in FIGS. 8 and 11. FIGS. 12a and 12b illustrate the flow paths for the individual next adjacent duct means of FIG. 8 when the system is used for flow inversion. As noted in connection with FIG. 1, the flow inversion system of this invention has been found to have utility without use of the means for switching to straight through flow. Accordingly, when switching is not desired, the basic elements 126', 126'', 126''', and 126'''' can be made integral or permanently connected at interface 144, in which case the basic building block ducts of the system would involve mated pairs of elements 126, joined as in FIGS. 8, 12a and 12b. It will also be noted that if flow switching is not desired that there will be no requirement for equal sized intermediate sections 144. Accordingly, the first and second duct means may be of unequal constant cross-sectional areas, thereby dividing the total flow into unequal portions if desired for a specific application. Also, as noted earlier, it should be borne in mind that in a practical system a single wall will be shared by next adjacent duct elements, and the radial (or vertical) entrance and exit walls 134, 136 are not necessary or desirable for most applications and are for purposes of illustration only.

FIGS. 12c and 12d illustrate flow paths for straight through flow when the invention is used with means for switching from, and to, inverted flow. It should be noted that in either the inverted or straight through flow modes of operation, the constant area duct means of this invention have been tested to show surprisingly high, and for most applications very satisfactory, flow efficiencies and drag parameters. Test specimens have utilized internal wall surfaces of controlled smoothness and so far as practical, longitudinally constant changes of curvature to prevent flow separation. As mentioned earlier, windtunnel model tests have shown pressure recovery exceeding 98 percent for velocities and lengths appropriate for aircraft engine uses.

FIG. 13 is a schematic illustration of the unique primary cross-sectional shapes involved in a single constant area duct means made up of two basic duct elements 126, disposed and joined for flow inversion. For convenience in illustration and description, the overall passageway space envelope is shown as a rectangular prism having the dimensions $b$, $2h$, and $L$. The entrance or first section, at the lower end as shown, is a laterally elongated rectangle extending from the lower side partially across the passageway and having an area: $A = b \cdot h$. The next or second defined cross-section is a triangle having a base on the lower side and extending to an apex on the upper side of the passageway and having the same area $A = 1/2 \, b \cdot 2h = bh$. The middle of the third section is a vertically elongated rectangle extending from the lower side to the upper side of the passageway and having the same area: $A = b/2 \cdot 2h = bh$. This third section would correspond to an interface section 144 in terms of the previously described basic duct elements 126, and hence would be the section at which the two basic duct elements 126 are joined. This joined section would normally occur at ½ L or the mid-length of the duct means. However, it will readily be recognized that, if desired, either of the basic duct elements may be lengthened or shortened to cause the interface section to fall in another location without departing from the concepts that have been disclosed. Testing to date has shown that excellent flow efficiency and pressure recovery can be achieved with duct length to height ratios as low as $L/2h = 4.0$. The next adjacent upstream, or fourth, section is a triangle having a base on the upper side and extending to an apex on the lower side of the passageway, and having the same area: $A = 1/2 \, b \cdot 2h = b \cdot h$. The exit, or fifth, section involves a laterally elongated rectangle extending from the upper side partially across the passageway and having the same area: $A = b \cdot h$. Each of the defined primary sections and all intermediate sections have the same area, viz., $A = b \cdot h$. Accordingly, the duct means of FIG. 13 will invert flow while maintaining a constant area along its length.

As noted previously, the vertical walls (134 and 136 in FIG. 7) extending between the triangular sections and the entrance and exit rectangular sections, are neither necessary nor desirable for most applications. Accordingly, in most practical embodiments, each of the individual duct elements will be fully closed sections only in the region between the two triangular sections illustrated in FIG. 13. Therefore, when a valve embodiment such as shown in FIG. 6 is viewed from either the entrance or exit ends, it will have the appearance of adjacent annular patterns separated only by an initially cylindrical center wall which is corrugated to have longitudinally extending roof and valley ridge lines.

Also, as previously mentioned, the straight line segments shown in FIGS. 7 through 13 are to be considered fully equivalent to corresponding curved or annular elements. For example, the following terminology would be directly equivalent: "lower" and "upper" corresponds to "inner" and "outer"; "laterally elongated rectangle" corresponds to "circumferentially elongated sector of an annulus"; "vertically elongated rectangle" corresponds to "radially elongated sector of an annulus"; and "above" or "below" corresponds to "closer to" or "farther from" the longitudinal axis of an annular section: Other comparative equivalents will readily occur to persons skilled in the mechanical arts.

FIGS. 14a through 16b illustrate the use of the variable bypass valve mechanism and engine cycle concepts of this invention in three different types of aircraft propulsion engines, viz.: a forward fan turbofan (14a and 14b); a forward and aft turbofan (15a and 15b); and a single split turbojet (16a and 16b); in both the high bypass (a) and low bypass (b) modes of operation. The advantages in engine cycle characteristics in each example shown will be apparent to persons skilled in this art. For each engine, substantially more air flow is worked on in mode (a) than in mode (b). Engine cycle pressure ratios will be changed when the forward fan isn't acting to compound the pressure of the aft fan and gas generator.

Figure 14A:
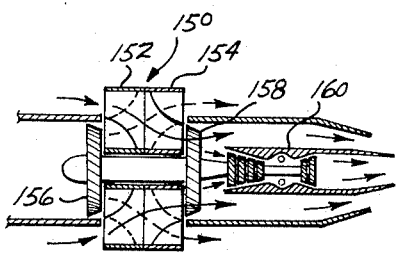
FIGS. 14, 15 and 16 schematically depict the valve flow control mechanism of the invention incorporated into three distinct and different engine configurations, with the engines shown both in the high bypass ratio mode and the low bypass ratio mode.
Figure 14B:
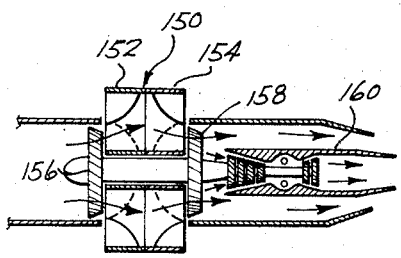

FIG. 14 illustrates a double fan turbofan engine wherein a valve system 150, with a relatively moveable forward position 152 and a fixed aft portion 154, has been installed between fans 156 and 158, well ahead of the core gas generator 160. Such an engine could be obtained from a JT8D type arrangement by separating the front fans; or from a JT 9D type configuration if the single large fan of that design were replaced by two smaller diameter fans. Such a JT9D modification would be attractive for several reasons. The smaller fans 156 and 158 need be only about 75 percent of the diameter of the large fan to accomplish the same work with less tip velocity and noise. Also, the fan-gas generator tip speed mismatch problem is reduced, allowing the gas generator tip speed to be increased to obtain a similar pressure ratio increase with fewer stages, thereby reducing weight and complexity of the gas generator unit.

Figure 15A:
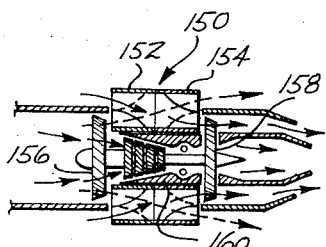
Figure 15B:
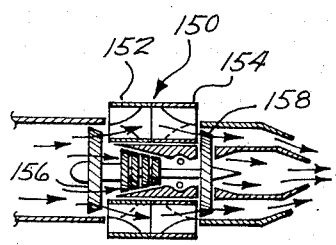
Figure 16A:
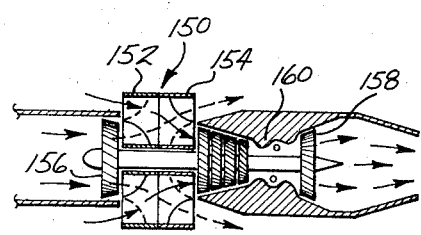
Figure 16B:
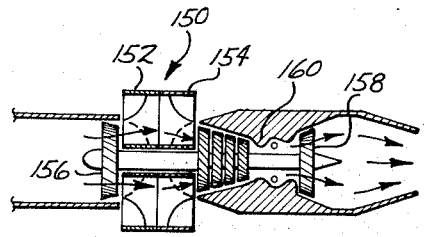

FIGS. 15 and 16 illustrate other arrangements of compressor and core components 156, 158 and 160 with respect to the valve system 150, 152 and 154. In FIG. 15 the core gas generator 160 is located between fans 156 and 158; with the valve 150 surrounding generator 160. This is similar to the arrangement of FIG. 14 with the overall engine length advantageously shortened by reason of the forward relocation of gas generator 160. Disadvantages would include interface sealing problems and difficult access for maintenance. FIG. 16 shows a modified turbojet embodiment, with valve system 150 located between the gas generator 160 and forward compressor 156.

The three engines schematically shown in FIGS. 14, 15 and 16 represent certain engine cycle variations available with the valve passageway concepts of this invention. Since the illustration is schematic, well-known expedients such as variable area nozzles, inlets, stators, and thrust augmentation devices are not shown, it being understood that persons skilled in this art will incorporate them if desired, for their known additional advantages. Other embodiments and valve structure arrangements will be obvious, and no attempt is made here to describe them all. Multiple splits using more than one valve system are possible and will be feasible for some installations. A multiple valve configuration would provide the alternative of selecting a multiplicity of bypass ratios and modes of operation. A small diameter valve located downstream of the inner exit annulus of a large valve would allow a second splitting of the original flow and could be used in certain cases for further increasing the effective bypass ratio and/or the pressure ratio of the engine.

FIGS. 17 and 18 show turbofan engine configurations similar to those shown in FIGS. 14 and 15, but modified in the low bypass mode to generate a source of high pressure air for use in STOL aircraft augmentor wing systems. Augmentor wing expedients, such as internally blown flaps, require a source of high pressure and high density air for delivery into spaced limited nacelle strut and wing design envelopes. An optimum takeoff configuration would have a fan delivery pressure of the order of 4.0 atmospheres and a bypass ratio of 2.0. For cruise, the inconsistent parameters of bypass ratio 4.0 and fan delivery pressure of 2.0 atmospheres would be required for efficient performance. The engines shown in FIGS. 17 and 18 have the unique capability of matching these diverse STOL aircraft takeoff and cruise requirements, without compromise of performance.

Figure 17A:
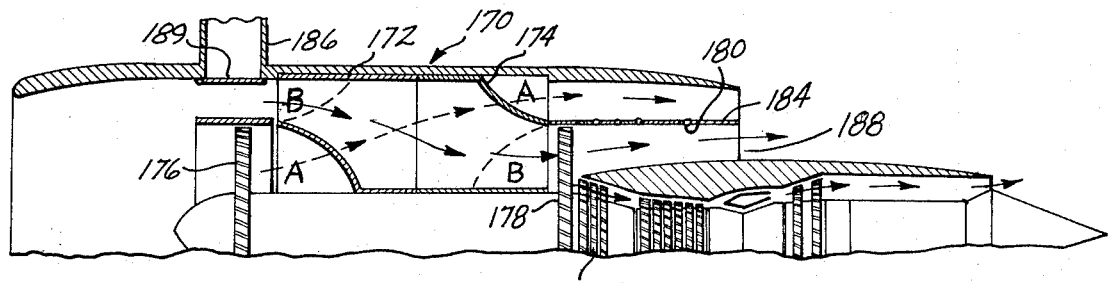
FIGS. 17a and 17b show a STOL engine configuration which will generate high pressure air for augmentor wing systems, such as internally blown flaps.
Figure 17B:
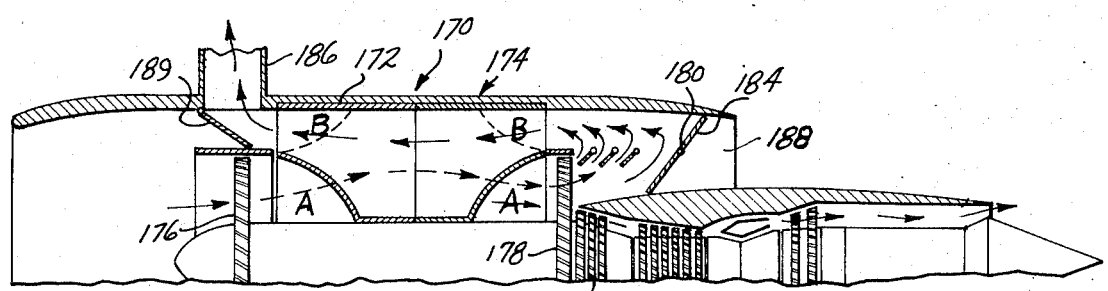
Figure 18A:
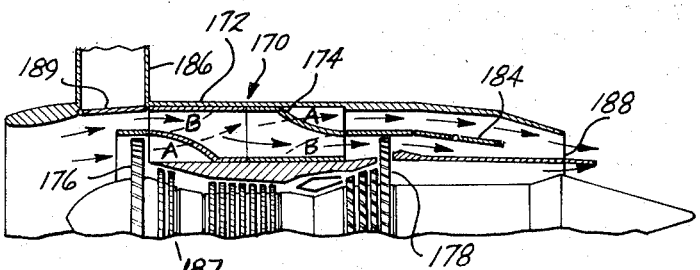
FIGS. 18a and 18b present an alternate STOL configuration similar to that of FIGS. 17a and 17b but of reduced overall length.
Figure 18C:
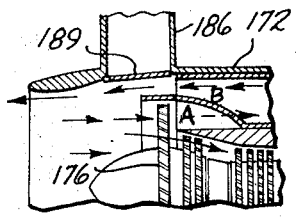
Figure 18B:
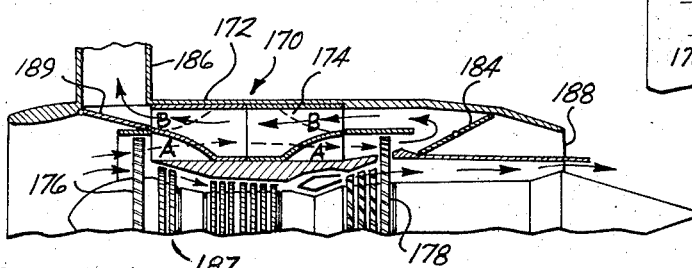

The primary difference in the engines of FIGS. 17 and 18, aside from minor duct details is the reduction in length afforded by the forward relocation of the core engine gas generator 187 in the FIG. 18 embodiment. Engine accessibility is diminished in FIG. 18, however, and the aft fan device requires a seal between the hot turbine flow and the fan flow. In FIG. 17 the gas generator pressure ratio is affected by the position of valve means 170, 172, 174, whereas in FIG. 18 the gas generator pressure ratio remains unchanged. Bypass ratio is changed in either embodiment by rotation of aft portion 174 of the valve means 170 with respect to forward portion 172. In each case the valve means 170 is located between compressor fans 176 and 178. A pivotal connection 180 is provided for a blocker door 184, located within nozzle 188, which remains in a stowed position for climbout and cruise flight, shown in FIGS. 17a and 18a, wherein a desirable bypass ratio of about 4.0 is achieved with a fan delivery pressure of 2.0 atmospheres. At takeoff, shown in FIGS. 17b and 18b, four atmosphere fan delivery air is supplied by a combined pressure rise of fans 176 and 178, routed by the blocking action of door 184 back into the straight through valve passageway B—B, then to the collection chamber annulus formed by duct blocker doors 189, and into the duct 186. Because of the valve passageway used, duct 186 may be conveniently located at the forward end of the engine as shown. This forward location is convenient for wing delivery and allows passage of the duct 186 through the forward portion of the nacelle strut where the nacelle diameter can be increased within minimum boattail drag problems. Other engine configurations designed for STOL purposes have required the use of external "horse-collar" types of collection chambers with accompanying cruise drag penalties.

A further advantage which is readily available in either configuration shown is illustrated in FIG. 18c wherein the duct blocker door 189 is retracted from the FIG. 18b takeoff position to provide a means for thrust reversal. The valve means 170 remains in the straight through mode, and therefore with door 189 removed from the path of the flow returning straight through valve passageway B—B, the flow will continue back through and out of the inlet to spoil, and reverse, the thrust of the engine. Other more conventional, reverser systems may also, of course, be used with the engines shown in these figures.

The last two sheets of the drawings present two new supersonic aircraft engine cycle concepts made possible with the valving systems of this invention, and advantageously used in combination with heating element thrust augmentation devices.

FIGS. 19a and 19b, present a new engine configuration, shown in the low and high bypass modes, which is descriptively called a Turbofan-Turbojet-Ramjet Engine (TTRE). FIGS. 20a, 20b and 20c show subsonic fuel comsumption, supersonic fuel consumption, and noise data plotted against thrust and comparing the TTRE with conventional engines. FIGS. 21a and 21b present a Turbofan-Ramjet Engine (TRE) and FIGS. 22a, 22b and 22c show comparative data plots similar to those for the TTRE embodiment.

Because variable cycle engines have not been considered practical in the past, engines presently being considered for supersonic aircraft are compromised designs which will yield generally satisfactory performance in several flight conditions. Turbofan engines having low bypass ratios of 1.0 to 2.0 are among the most common candidates, but are not optimum performers in either subsonic or supersonic flight. In most supersonic installations, a larger thrust requirement exists at transonic climb and acceleration, and supersonic cruise, than exists at subsonic cruise. Therefore, an augmentor or afterburner device located in the jet efflux is often used to boost the thrust for these conditions.

FIGS. 19a and 19b depict the TTRE configuration, the central portion of which resembles a turbojet engine, wherein a valve pasaageway system 190, comprising a fixed forward portion 192 and a moveable aft portion 194, is located between forward fan 196 and gas generator 198. The generator 198 includes compressor and turbine stages, and a centrally located burner unit 199. A bypass duct 200 is provided with heat actuated thrust augmentor units 202, and a variable area nozzle 204 of any conventional design, to provide a modulated thrust output.

FIGS. 21a and 21b show the TRE configuration, the central portion of which resembles a turbofan engine, with an aft fan 197 and an aft fan duct 206 which were not present in the TTRE configuration of FIGS. 19a and 19b. Other numerals shown on the TRE represent corresponding components to those described for the TTRE of FIG. 19.

The location of augmentor units such as 202 in an outer duct surrounding a jet engine has been proposed in the past, and is commonly known as a wrap-around ramjet. However, such prior art wrap-around ramjets have not been considered practical since they are capable of use only during supersonic flight and represent a size and weight penalty for subsonic flight. Either a conventional ramjet or a wrap-around ramjet must operate at aircraft velocities of the order of Mach No. M = 1.8 in order to produce useful thrust. At lower speeds, ram pressures are normally too low to provide proper combustion pressures and useful thrust. However, the TTRE and TRE configurations of FIGS. 19a and 21a cause the outer or bypass ducts to be pressurized during low speed flight by the front fan acting through the unique valve mechanisms 190 in their high bypass positions. Therefore, the TTRE and TRE can be augmented at any flight speed. This is not possible with conventional ramjet or wrap-around ramjet engines.

At takeoff either the TTRE or the TRE would operate in the high bypass ratio positions shown in FIGS. 19a and 21a. The augmentors 202 and the nozzle 204 would be responsive to pilot throttle control to act upon the flow from front fan 196 to produce a bypass duct exit velocity approximately equal to that of the primary jet. This will result in greatly reduced jet noise and increased thrust compared with conventional engines, as is graphically shown in the plots of FIGS. 20c and 22c. The primary jet velocity is reduced in the TTRE and TRE because of the increased turbine specific work and/or discharge pressure and temperature. The thermodynamic cycle and size of the engine gas generators is assumed to be equal in these comparisons.

At subsonic cruise, the TTRE and TRE continue to operate in the high bypass mode of FIGS. 19a and 21a, but the augmentor units 202 are turned off. Specific fuel comsumption is improved over conventional engines primarily because of propulsive efficiency of the higher bypass ratio, as illustrated in the plots of FIGS. 20a and 22a.

At start of transonic flight for supersonic climb and acceleration, the TTRE and TRE remains in the high bypass mode, but the augmentor units 202 are turned on full to produce the largest thrust margin possible for the aircraft to pass quickly through the transition to supersonic cruise.

When supersonic cruise altitude and speed are reached, the valve mechanism 190 is switched to the low bypass ratio mode shown in FIGS. 19b and 21b. Duct 202 is no longer pressurized by the fan 196, and now receives ram-pressurized air directly from the engine inlet. To provide an additional specific fuel consumption improvement, the augmentor units 202 are then turned on in the rampressurized duct. This then comprises a completely independent ramjet engine surrounding the core engine, which for the TTRE is a turbojet, and for the TRE is a turbofan. When the ramjet is modulated (thrust set by augmentor temperature), and used with the core engine at full power, the improved specific fuel consumption shown in the plots of FIGS. 20b and 22b is achieved.

It should be apparent that the TTRE and TRE configurations will maintain relatively constant inlet capture area with reduced spillage drag and appropriate nozzle areas throughout all flight conditions. This substantially reduces installed drag losses over conventional supersonic engines which inherently have a mismatch of inlet and nozzle for subsonic and transonic flight. The TTRE and TRE make efficient use of all ducts, inlets and nozzles during all flight conditions. As has been shown, the unique valve means of this invention makes it possible to configure engines having multiple cycle modes of operation not feasible with prior art techniques. Both the TTRE and TRE represent substantial advantages over conventional engines.

The choice of whether to use a TTRE or a TRE would depend upon detailed weight and performance comparisons, and the relative importance of subsonic vs. supersonic requirements. The turbojet based TTRE would favor the supersonic mode, while the turbofan based TRE would favor the subsonic mode of operation. In a typical aircraft installation; for example, a supersonic transport, either configuration would show substantial benefits over conventional engines in terms of reduced noise at takeoff, and improved range for subsonic and supersonic cruise.

Many variations in the preferred engine embodiments shown will occur to persons skilled in this art in the light of the disclosed passageway, valve, and engine cycle concepts. The annular passageways of the preferred embodiments have been described as divided into $n$ separate duct elements, where $n = 16$ for the FIGS. 4 and 5 configurations. However, it should be apparent that the basic duct geometric element shapes can be applied where $n$ ranges from 2 to $\infty$. In the lower limiting case of $n = 2$, each basic duct element will occupy a whole or 360° annulus at the entrance and exit sections, and a 180° sector of an annulus at the central or interface plane. In any case, there will be one locus line L of the type described in FIGS. 4 and 5 for each of the $n$ basic duct elements of the system, and the center wall element 64' is reshaped about the locus line L as described. For the valve embodiments, it has been shown that flow switching may be accomplished by relative rotation by $360°/n$ of one valve portion with respect to the other. It will be apparent that the flow switching could be accomplished by other means, since all that is required is to redirect flow to alternate duct element sectors of the opposite portion of the valve. For example, the forward and aft portions could be spaced apart longitudinally and an intermediate flapper valve used to switch the flow. However, flapper valves can be fully efficient only in one position, where the flow remains straight between valve portions. Accordingly, the best means for switching the flow patterns developed to date appears to involve a relative rotation of $360°/n$, because then in either mode of operation the flow passes straight through the interface plane. Switching flow patterns by rotation as described can be rapidly accomplished but may of course cause minor flow perturbations. However, it would appear that at reduced throttle settings, the switching of flow patterns may be accomplished with minor disturbance, particularly where $n$ is a large number as in the $n = 16$ embodiment of FIGS. 4 and 5.

Minor modifications and improvements to the embodiments and concepts here disclosed are not considered to depart from the spirit and scope of the invention. Accordingly, it is intended in the appended claims to cover all such variations and modifications.

What is claimed is:

1. In a propulsion engine, flow control system for establishing the effective bypass ratio of said engine comprising first and second smooth aerodynamically clean duct means for inverting the spatial relationship of separated adjacent concentric annular flow patterns within the confines of an annular passageway having an area substantially equal to the combined area of the two separate flow patterns at substantially all locations along the length of said passageway.

2. The system of claim 1 wherein said first and second duct means are each divided at their entrance and exit sections into $n/2$ circumferentially extending annular sectors and said means for switching flow patterns comprises means for causing relative rotational displacement between said forward and aft portions of $360°/n$.

3. A turbine engine with a fluid flow control system located between two blade elements comprising means for inverting the respective positions of two separate flow patterns between the entrance and exit ends of said system, and means for switching the respective positions of said two flow patterns from their inverted positions to the same respective positions at each of said entrance and exit ends.

4. An air breathing turbine engine comprising a forwardly located fan, a centrally located core gas generator system including compressor and turbine stages, an annular bypass duct communicating with a discharge nozzle, and a flow control system located just downstream of said fan comprising: separated annular first and second duct means shaped and arranged to crossover and invert two air flow patterns within the confines of an annular passageway, wherein each of said first and second duct means have constant cross-sectional areas the total combined area of which is substantially equal to the area of said annular passageway.

5. The engine of claim 4 wherein said first and second duct means are each longitudinally divided into separate forward and aft portions, and which further includes means for selectively switching flow patterns between said forward and aft positions to thereby eliminate the inversion of flow patterns and cause said flow to pass straight through said passageway.

6. In an air breathing turbine engine which includes a forwardly located fan, a centrally located core gas generator having compressor and turbine stages, and an annular bypass duct, an improved flow control system for establishing the effective bypass ratio of said engine comprising an annular passageway located downstream of said fan and divided by a central wall means into separate first and second duct means having a combined area substantially equal to the total area of said annular passageway at any position along its length; said first duct means having an annular entrance cross-section extending from an inner wall of said passageway to said central wall means and an annular exit cross-section extending from the outer wall of said passageway to said central wall means such that air is received from said fan and delivered directly to said bypass duct; said second duct means having an annular entrance cross-section extending from the outer wall of said passageway to said central wall means and an annular exit cross-section extending from the inner wall of said passageway to said central wall means such that inlet air which has not been acted upon by said fan is received and delivered to a compressor stage of said core gas generator.

7. The engine of claim 6 wherein each of said first and second duct means are longitudinally divided into separate forward and aft portions, and which further includes means for switching flow patterns between said forward and aft portions to eliminate the inverting of the spatial relationship of the flow patterns such that the flow passes straight through the annular passageway and thereby changes the effective bypass ratio of said engine.

8. A propulsion engine comprising a flow control system for internal management and routing of propulsive fluid comprising: a plurality of adjacent basic duct element means located within a longitudinally extending passageway for establishing individual flow patterns characterized by constant cross-sectional areas, and cross-sectional shapes which make smooth gradual longitudinal transitions from a generally rectangular section extending only partially across the passageway at one end of the flow pattern, to a three-sided section extending entirely across the passageway at an intermediate section, and then to a generally rectangular section extending entirely across the passageway at the opposite end of the flow pattern.

9. A method for improving the efficiency of a propulsion engine having an annular passageway for control of propulsive fluid, said method comprising;
dividing said passageway into first and second smooth aerodynamically clean annular flow patterns such that said first flow pattern is located adjacent to, inside of, and concentric with, said second flow pattern at the entrance end of said passageway and such that the combined total cross-sectional area of the first and second flow patterns is substantially equal to the cross-sectional area of said passageway at substantially all locations between the entrance and exit ends of said passageway;
compressing the fluid flowing into the first flow pattern;
discharging said first and second flow patterns at the exit end of said passageway in an inverted spatial relationship to that which exists at the entrance end of said passageway such that said second flow pattern is located adjacent to, inside of, and concentric with, said first flow pattern; and
directing fluid flowing out of said passageway into an annular bypass duct for delivery to a discharge nozzle system.

10. The method of claim 9 which further includes:
selectively changing the bypass ratio of said engine by switching the relative positions of said first and second flow patterns at the exit end of said passageway such that said first flow pattern remains located inside of and concentric with said second flow pattern.

11. A propulsion engine configuration which includes a flow control system for inverting two flow patterns within a longitudinally extending annular fluid passageway, said system comprising separate first and second smooth aerodynamically clean duct means having adjacent annular cross-sections at the entrance end and the exit end of said passageway and having a combined total cross-sectional area substantially equal to the cross-sectional area of said annular fluid passageway at substantially all locations between said entrance and exit ends; and wherein the entrance cross-section of said first duct means is concentric with and surrounds the entrance cross-section of said second duct means; and wherein said first and second duct means are shaped and arranged to invert the flow pattern such that the exit cross-section of said second duct means is concentric with and surrounds the exit cross-section of said first duct means; thereby discharging two separate flow patterns at the exit end of said passageway in an annular adjacent relationship which is inverted from that existing at said entrance end of said annular fluid passageway.

12. The system of claim 11 comprising a circular inner wall and a circular outer wall defining the boundaries of said annular passageway, and center wall means for controlling the internal flow within said passageway; said center wall means forming first and second duct means having adjoining first and second duct elements; said first duct element having, at said entrance end, a cross-section extending radially between said inner wall and said center wall means; said second duct element having, at said entrance end, a cross-section adjoining said first duct element at said center wall means and extending radially therefrom to said outer wall; said first and second duct elements having, at a section intermediate said entrance and exit ends, adjoining cross-sections extending radially substantially across said passageway between said inner and outer walls; said first duct elements having, at said exit end, a cross-section extending radially between said outer wall and said center wall means; said second duct element having, at said exit end, a cross-section adjoining said first duct element at said center wall means and extending radially therefrom to said inner wall.

13. The system of claim 12 wherein said first and said second duct means have substantially equal constant areas and wherein said center wall means includes a wall segment the opposite sides of which provide boundary surfaces for said two adjoining duct elements, said wall segment being continuously reshaped and rotated about a locus line which extends parallel to said longitudinal axis such that the cross-sectional areas of said adjoining duct elements will remain substantially equal along the longitudinal extent of said passageway.

14. The flow control system of claim 13 wherein the system is divided into separated forward and aft portions at a section intermediate said entrance and exit ends at which the duct elements have adjoining cross-sections extending radially substantially across the passageway; and wherein there is provided means for selectively switching flow patterns between adjoining duct elements of said forward and aft portions to thereby cause the flow control system to function as a valve means for switching from inverted to straight through flow.

15. The flow control system of claim 14 wherein said valve means comprises means for causing relative rotation between said forward and said aft portions to selectively realign next adjacent duct elements.

16. A propulsion engine configuration comprising a flow system for changing the relative positions of two separated adjacent flow patterns within the confines of a longitudinally extending fluid passageway having an area substantially equal to the combined total area of the two flow patterns at any location along the longitudinal extent of said passageway; said system comprising center wall means forming a first duct means and a second duct means; said first and second duct means sharing a common wall segment of said center wall means, the opposite sides of said wall segment acting as boundary surfaces for said first and second duct means; said wall segment being rotated and reshaped about a longitudinally extending locus line such that, at the entrance end of said passageway said first duct means comprises a cross-section extending from one side of said passageway to said wall segment, and said second duct means comprises a cross-section extending from said wall segment to the opposite side of said passageway; and at a longitudinal position located downstream from said entrance section said first and second duct means have first and second duct elements which have adjoining cross-sections extending substantially across said passageway and separated by said wall segment which extends substantially across said passageway from said one side to said opposite side of said passageway.

17. The system of claim 16 wherein each of said first and second duct means comprise cross-sectional areas which remain substantially constant at all locations along the longitudinal extent of said passageway.

18. The system of claim 16 wherein the cross-sectional area of said first duct means is substantially equal to the cross-sectional area of said second duct means at all locations along the longitudinal extent of said passageway.

19. The system of claim 16 wherein each of said first and second duct elements is characterized by a constant area cross-section making a smooth longitudinal transition from a generally rectangular entrance section, downstream to a generally triangular section, and further downstream to a generally rectangular section extending entirely across said passageway.

20. The system of claim 16 wherein said passageway has a circular configuration and each of said first and second duct elements is characterized by a constant area cross-section making a smooth longitudinal transition from a segment of an annulus extending only partially across said passageway, downstream to a three-sided section having three curved sides, and downstream to a segment of an annulus extending entirely across said passageway.

21. The system of claim 18 wherein said first and second duct means extend integrally and continuously to said position at which said first and second duct elements have adjoining cross-sections extending entirely across said passageway, and wherein at said position said first and second duct means are sectioned into separate forward and aft portions each having identical interface cross-sections on opposite sides of said position, and wherein said system includes valve means for selectively switching flow patterns between adjoining duct elements of said forward and aft portions to thereby cause said system to function as a valve means for switching from inverted to straight through flow.

22. The system of claim 21 wherein said valve means comprises means for causing relative movement between said forward and aft portions to selectively realign next adjacent duct elements.

23. The engine of claim 3 wherein said system is located within the confines of a fluid passageway having a cross-sectional area substantially equal to the combined area of said two flow patterns.

24. The engine of claim 23 wherein the boundaries of said system are defined by two oppositely facing walls and the boundaries of said two separated flow patterns are defined by central wall means; and wherein said means for switching includes means for selectively moving at least a portion of said central wall means to cause either inverted or straight through flow.

25. The engine of claim 23 wherein said system comprises duct elements characterized by generally rectangular cross-sections at said entrance end, generally three-sided cross-sections intermediate said ends, and generally rectangular sections at said exit ends.

26. The engine of claim 23 wherein the oppositely facing walls are circular in shape and said system includes duct elements characterized by cross-sections which are segments of an annulus at said entrance end, are curvilinear sections having three curved sides intermediate said ends, and are segments of an annulus at said exit end.

27. The engine of claim 26 wherein said duct elements have walls the opposite sides of which provide boundary surfaces between said two flow patterns.

28. The engine of claim 27 wherein said fluid passageway is symmetrically disposed around the longitudinal axis of said engine and said duct elements cross-sections each maintain a plane of symmetry extending along a radial plane passing through said longitudinal axis.

29. A method for improving the efficiency of a propulsion engine having an annular passageway for control of propulsive fluid, said method comprising:
dividing said passageway into first and second annular flow patterns such that said first flow pattern is located adjacent to, inside of, and concentric with, said second flow pattern at the entrance end of said passageway;
compressing the fluid flowing into the first flow pattern;
discharging said first and second flow patterns at the exit end of said passageway in an inverted spatial relationship to that which exists at the entrance end of said passageway such that said second flow pattern is located adjacent to, inside of, and concentric with, said first flow pattern;
directing fluid flowing out of said passageway into an annular bypass duct for delivery to a discharge nozzle system; and
selectively changing the bypass ratio of said engine by switching the relative positions of said first and second flow patterns at the exit end of said passageway such that said first flow pattern remains located inside of and concentric with said second flow pattern.

30. The method of claim 29 which additionally comprises directing fluid flowing out of said passageway into an annular duct for delivery to a compressor.

31. The method of claim 29 which additionally comprises dividing said passageway such that at least one of said flow patterns maintains a substantially constant cross-sectional area between said entrance and said exit ends.

32. The method of claim 31 which additionally comprises dividing said one of said flow patterns into a plurality of separated flow pattern elements.

33. The method of claim 32 which additionally comprises dividing said one of said flow patterns into a plurality of separated flow pattern elements such that each element has a generally rectangular cross-section at said entrance end, a generally three-sided cross-section intermediate said entrance and said exit ends, and a generally rectangular section at said exit end.

34. The method of claim 29 wherein said passageway is divided such that said flow pattern has approximately the same cross-sectional area as said second flow pattern at each of said entrance and exit ends.

35. In a propulsion engine, a flow control system for establishing the effective bypass ratio of said engine comprising first and second duct means for inverting the spatial relationship of separated adjacent concentric annular flow patterns within the confines of an annular passageway having an area substantially equal to the combined area of the two separated flow patterns, wherein each of said first and second duct means are longitudinally divided into separate forward and aft portions, and which further includes means for switching flow patterns between said forward and aft portions to thereby eliminate the inverting of the spatial relationship of the flow patterns such that the flow effectively passes straight through the annular passageway.

* * * * *